(12) United States Patent
Okabe et al.

(10) Patent No.: US 11,474,118 B2
(45) Date of Patent: Oct. 18, 2022

(54) SPECIMEN TRANSPORTING DEVICE AND SPECIMEN TRANSPORTING METHOD

(71) Applicant: Hitachi High-Technologies Corporation, Tokyo (JP)

(72) Inventors: Shugo Okabe, Tokyo (JP); Tatsuya Fukugaki, Tokyo (JP)

(73) Assignee: Hitachi High-Tech Corporation, Tokyo (JP)

( * ) Notice: Subject to any disclaimer, the term of this patent is extended or adjusted under 35 U.S.C. 154(b) by 539 days.

(21) Appl. No.: 15/558,649

(22) PCT Filed: Feb. 26, 2016

(86) PCT No.: PCT/JP2016/055742
§ 371 (c)(1),
(2) Date: Sep. 15, 2017

(87) PCT Pub. No.: WO2016/158122
PCT Pub. Date: Oct. 6, 2016

(65) Prior Publication Data
US 2018/0106820 A1    Apr. 19, 2018

(30) Foreign Application Priority Data

Mar. 30, 2015  (JP) .............................. JP2015-067899

(51) Int. Cl.
*G01N 35/00*    (2006.01)
*G01N 35/02*    (2006.01)
(Continued)

(52) U.S. Cl.
CPC ....... *G01N 35/00732* (2013.01); *G01N 35/02* (2013.01); *B65G 29/00* (2013.01);
(Continued)

(58) Field of Classification Search
CPC .... G01N 35/00732; G01N 35/02; G01N 1/28; G01N 35/04; G01N 35/00;
(Continued)

(56) References Cited

U.S. PATENT DOCUMENTS 5,730,276 A    3/1998  Itoh
6,343,690 B1 *  2/2002  Britton ................ B65G 17/002
                                            198/867.06

(Continued)

FOREIGN PATENT DOCUMENTS

JP          8-220105 A    8/1996
JP       2000-81439 A    3/2000
(Continued)

OTHER PUBLICATIONS

International Search Report (PCT/ISA/210) issued in PCT Application No. PCT/JP2016/055742 dated May 24, 2016 with English-language translation (five (5) pages).
(Continued)

*Primary Examiner* — Benjamin R Whatley
*Assistant Examiner* — Curtis A Thompson
(74) *Attorney, Agent, or Firm* — Crowell & Moring LLP

(57) ABSTRACT

A specimen transporting apparatus and method are provided, in which a specimen container having a non-printed region and a printed region on a side surface of the specimen container is rotated intermittently, each time through a certain angle, during a first rotation. Information printed on the printed region is read during the first rotation, and the location of the non-printed region is identified based on the success or failure of the reading. Next, a second rotation is performed, in which the specimen container is rotated continuously. The information printed on the printed region is read during the second rotation, and the location of the printed region is identified based on the success or failure of the reading. Accordingly, the location of an end portion of the printed region is identified, and the orientation of a specimen bar code is aligned relative to a transfer destination rack.

3 Claims, 13 Drawing Sheets

(51) Int. Cl.
  *B65G 47/244* (2006.01)
  *G06K 13/107* (2006.01)
  *G01N 35/04* (2006.01)
  *G01N 1/28* (2006.01)
  *B65G 29/00* (2006.01)

(52) U.S. Cl.
  CPC .............. *B65G 47/244* (2013.01); *G01N 1/28* (2013.01); *G01N 35/00* (2013.01); *G01N 35/04* (2013.01); *G01N 2035/00752* (2013.01); *G06K 13/107* (2013.01)

(58) Field of Classification Search
  CPC .......... G01N 2035/00752; B65G 29/00; B65G 47/244; G06K 13/107
  See application file for complete search history.

(56) References Cited

U.S. PATENT DOCUMENTS

| | | | | |
|---|---|---|---|---|
| 2005/0196323 | A1* | 9/2005 | Itoh | G01N 35/00732 422/82.05 |
| 2010/0012460 | A1* | 1/2010 | Pedrazzini | G01N 35/00732 198/394 |
| 2011/0215149 | A1* | 9/2011 | Ohmae | G01N 35/00732 235/437 |
| 2013/0281279 | A1* | 10/2013 | Yagi | B04B 9/146 494/1 |
| 2014/0294699 | A1* | 10/2014 | Akutsu | G01N 35/04 422/551 |
| 2014/0301916 | A1* | 10/2014 | Ohga | B01L 9/06 422/562 |

FOREIGN PATENT DOCUMENTS

| | | | |
|---|---|---|---|
| JP | 2000081439 | * 3/2000 | ............ G01N 35/02 |
| JP | 2004-28962 A | 1/2004 | |
| JP | 2014-6094 A | 1/2014 | |
| WO | WO 2013/099538 A1 | 7/2013 | |

OTHER PUBLICATIONS

Japanese-language Written Opinion (PCT/ISA/237) issued in PCT Application No. PCT/JP2016/055742 dated May 24, 2016 (five (5) pages).

Extended European Search Report issued in counterpart European Application No. 16772006.9 dated Nov. 14, 2018 (16 pages).

* cited by examiner

SPECIMEN TRANSPORTING DEVICE AND SPECIMEN TRANSPORTING METHOD

TECHNICAL FIELD

The present invention relates to a device including a mechanism that transfers a specimen container. Particularly, the present invention relates to a mechanism that reads information of the container.

BACKGROUND ART

In a common specimen pretreatment system, in an analysis system, or in the like, a label, on which a bar code, a two-dimensional code, or the like is printed, is used to control a specimen. Specifically, the label is attached on a side surface of a specimen container, and information of the label is optically read on a transport route of a carrier that transports the specimen container. In this manner, the specimen is controlled.

However, the shape of the carrier that transports the specimen container varies depending on the system in some cases. For example, a holder that holds one specimen container is transported in the pretreatment system, and a rack that holds five or more specimen containers is transported in the analysis system, in some cases. In these cases, a reading method of the bar code on the specimen container varies depending on the carrier. In general, a method of rotating and reading the specimen container is used in the transport with the holder, and a method of reading from a slit (longitudinal groove) corresponding to an accommodating hole of the rack is used in the transport with the rack. In particular, in a case of using a rack type that is capable of holding a plurality of specimen containers, when a bar code region of the label of the specimen container transferred in the rack does not face a reading direction of a bar code reader, it is not possible to perform the reading with accuracy. Then a problem arises in that it is not possible to recognize the specimen.

For addressing the problem described above, there is proposed a technology in which, in a specimen transferring device that transfers a specimen between a holder and a rack, a bar code is read while the specimen container on the holder is rotated, the rotation of the specimen container is stopped at a position at which the specimen bar code is read such that orientations of the bar codes are aligned, and a robot arm performs transferring to the rack (PTL 1).

CITATION LIST

Patent Literature

PTL 1: WO2013/099538

SUMMARY OF INVENTION

Technical Problem

In the technology disclosed in PTL 1, variability arises in a rotational stopping position depending on a position at which reading of a bar code begins. For example, as illustrated in FIG. 10, in a case where a bar code is placed facing an end portion of a printed region with respect to a bar code reader (FIG. 10(a)) and in a case where the bar code is placed facing the vicinity of the center of the printed region with respect to a bar code reader (FIG. 10(b)), as a result, it is possible to discern that a bar code label faces a side of the bar code reader; however, variability in orientations of label surfaces arises. In particular, in a case where it is necessary to align the orientations of the label surfaces of a plurality of specimen containers, it is not possible to align the orientations of the label surfaces through the method described above without the variability.

Solution to Problem

In consideration of the problem described above, features of the present application are as follows. In other words, a specimen transferring device includes: a holder that holds one specimen container; means that transports the holder; means that reads a bar code of a specimen on the holder; rotating means that rotates the specimen container, a rack that holds at least one specimen container; means that transfers the specimen container to the rack; and control means that determines success or failure of the reading of the specimen bar code, implements rotation control on the basis of the determination, and aligns orientations of the specimen bar code relative to the transfer destination rack. In the control, through the determination of the success or failure of the reading of the bar code, as factors in a case where the bar code is not read, it is possible to discriminate whether a region does not have the bar code or the bar code is not read in the region due to any obstacle or an influence of printing.

For example, a first rotation is performed, in which the specimen container having the non-printed region and the printed region on the side surface thereof is rotated intermittently, each time through a certain angle. Additionally, information printed on the printed region on the side surface of the specimen container is read while the first rotation is being performed, and the location of the non-printed region of the specimen container is identified on the basis of the success or failure of the reading. Next, a second rotation is performed, in which the specimen container is rotated continuously. Additionally, the information printed on the printed region on the side surface of the specimen container is read while the second rotation is being performed, and the location of the printed region of the specimen container is identified on the basis of the success or failure of the reading. By this means, the location of an end portion of the printed region is identified, and control is implemented to align the orientation of the specimen bar code relative to the transfer destination rack.

Advantageous Effects of Invention

According to the present invention, in a simple configuration, it is possible to align the orientations of label surfaces of the specimen containers on which a bar code label is attached.

DESCRIPTION OF EMBODIMENTS

Hereinafter, examples of the present invention will be described with reference to the figures.

Example 1

Figure 1:
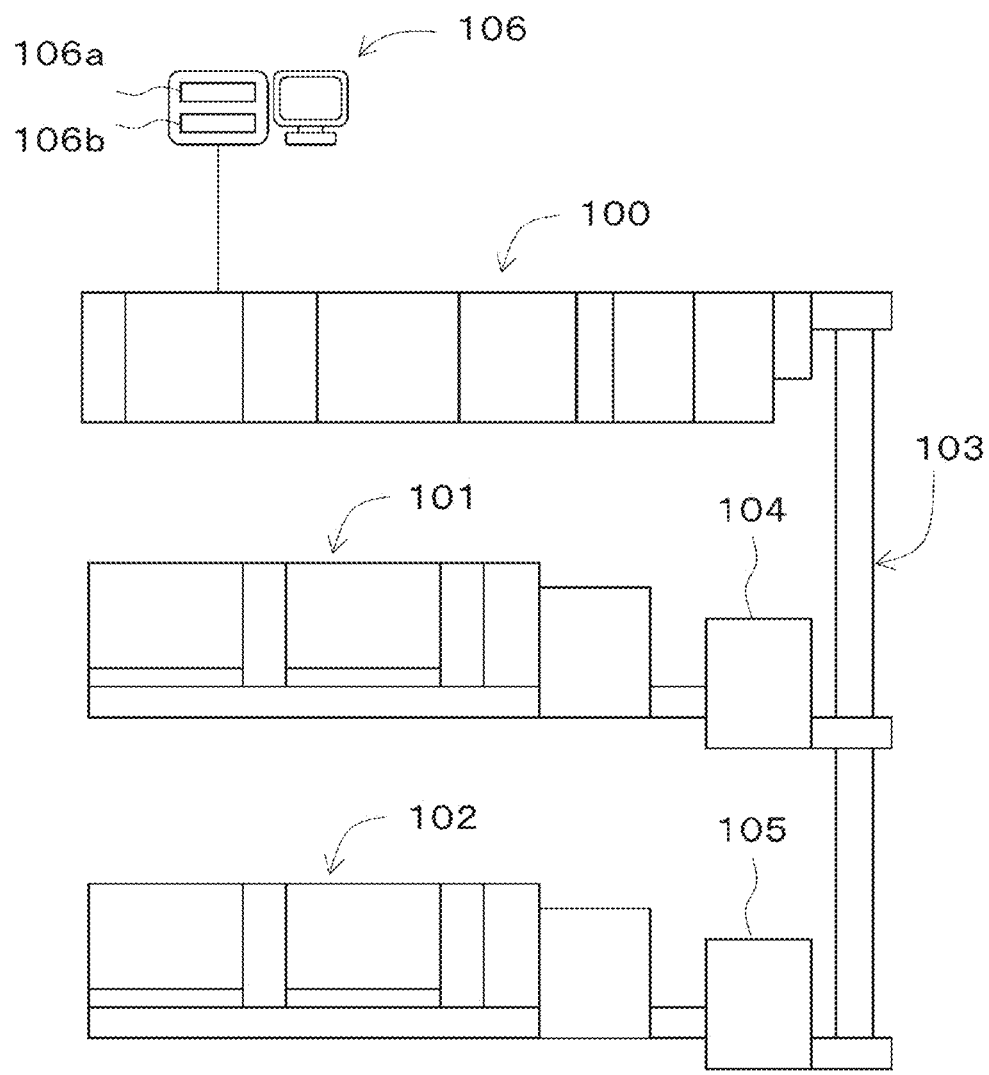
FIG. 1 is a view illustrating an entire configuration of a specimen transporting system.

FIG. 1 is a view illustrating an entire configuration of a specimen container transporting system of the present invention.

The specimen container transporting system according to the present invention has a configuration in which a pretreatment system and an analysis system are connected to each other via a transporting line.

The pretreatment system includes, in a simple overview: a pretreatment device 100 that implements various types of pretreatment on a specimen contained in a specimen container; a plurality of (in the embodiment, two) analysis devices 101 and 102 that implement analysis treatment on the specimen in the specimen container on which the pretreatment has been implemented; a transport path 103 through which a specimen container holder, on which the specimen container is mounted, is transported between the devices of the pretreatment device 100 and the analysis devices 101 and 102; a plurality of (in the embodiment, two) specimen container transferring mechanism units 104 and 105 that are provided between the transport path 103 and the plurality of analysis devices 101 and 102, respectively, and transfer the specimen containers between the specimen container holder transported through the transport path 103 and a specimen container rack on which the specimen container is mounted and transported in the analysis devices 101 and 102; and a control unit 106 that controls an operation of an entire specimen treating system.

Note that the control unit 106 includes a transfer control portion 106*a* that controls operations of the specimen container transferring mechanism units 104 and 105 and a storage portion 106*b* that stores specimen information such as analysis items or priority information of the specimen contained in the specimen container that is input to the specimen treating system, a relationship between specimens of identifiers. A specimen transferring device is configured to include some of the specimen container transferring mechanism units 104 and 105, the transfer control portion 106*a*, and the storage portion 106*b*.

The pretreatment system 100 is configured to include a plurality of linked units having various functions. The pretreatment system is configured to include, for example: a specimen input unit for inputting the specimen container in which the specimen is contained; a centrifugal separation unit that implements a centrifugal separation process on the specimen; an opening unit that opens a cover of the specimen container; an identification information attaching unit that attaches identification information such as a bar code on a child specimen container; a dispersing unit that disperses the specimens subdivided in child specimen containers from the specimen container; a closing unit that closes the cover of the specimen container; and an accommodation unit that accommodates the specimen container on which the treatment is ended. Note that the configuration of the system is provided as only an example, the pretreatment system may include another functional unit. The units of the pretreatment system 100 are connected to one another via the transport paths, and a specimen container 1 mounted on the specimen container holder is transported via the transport paths.

The analysis system can be connected to various automatic analysis devices such as a biochemical analyzer, an immunoassay device, or a coagulation analyzer which are used for clinical use, depending on the application.

Figure 2A:
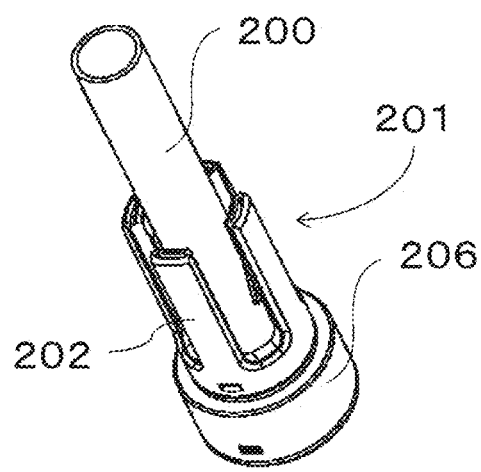
FIGS. 2A and 2B are views illustrating the external appearance of a specimen rack.
Figure 2B:
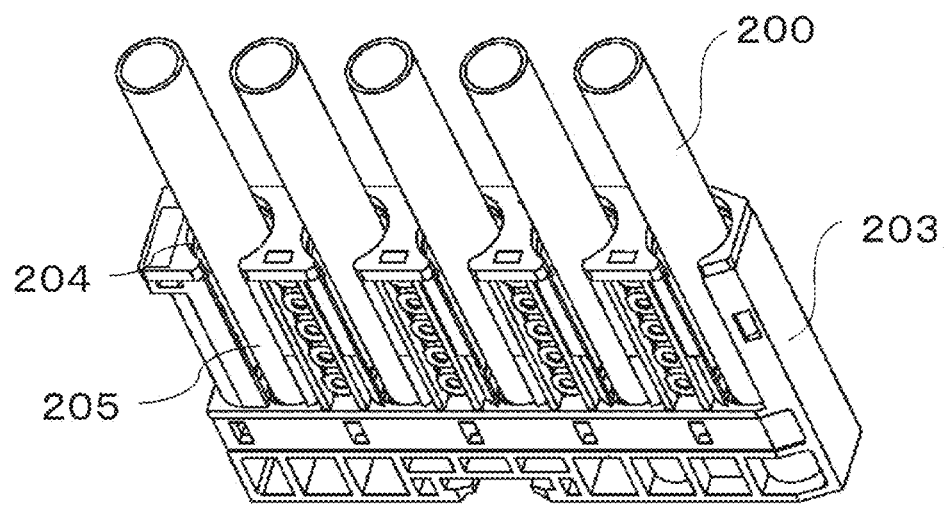

FIG. 2 is a view illustrating the external appearances of the holder and the rack used in the present invention.

FIG. 2(*a*) illustrates a holder (single rack) and the holder includes a base portion 206 having a circular cylinder shape and a support 201 that is provided on the base portion and supports a side wall of a specimen container 200. The support has a shape in which a plurality of support posts 202 project upward. The support posts are disposed to be separated at specified-angle intervals on a circumference, and it is possible to read a bar code label between adjacent support posts in a case where the bar code label is attached on the side surface of the specimen container.

Since the external appearance of the base portion 206 has the circular cylinder shape, the holder easily rotates in friction or the like with a side wall provided on a side of a transporting line during transport on the transporting line or a diverging portion. Therefore, it is difficult to always control an orientation of the bar code label stretched over the specimen container that is held on the holder, and the bar code label surface of the specimen container that is held on the holder transported to a reading position of the bar code label has an orientation in which a bar code reader cannot read the bar code in some cases.

On the other hand, FIG. 2(*b*) illustrates a rack 203. The rack has a longitudinal direction in a transporting direction through the transporting line and is configured to have five positions 204 that are disposed to hold the specimen containers 200X). The side surface of the five-position rack is provided with a slit 205 for each position such that it is possible to discern, from outside, the bar code label attached on an outer wall of the specimen container. The bar code reader reads the bar code label of the specimen container via the slits of the five-position rack.

Figure 3:
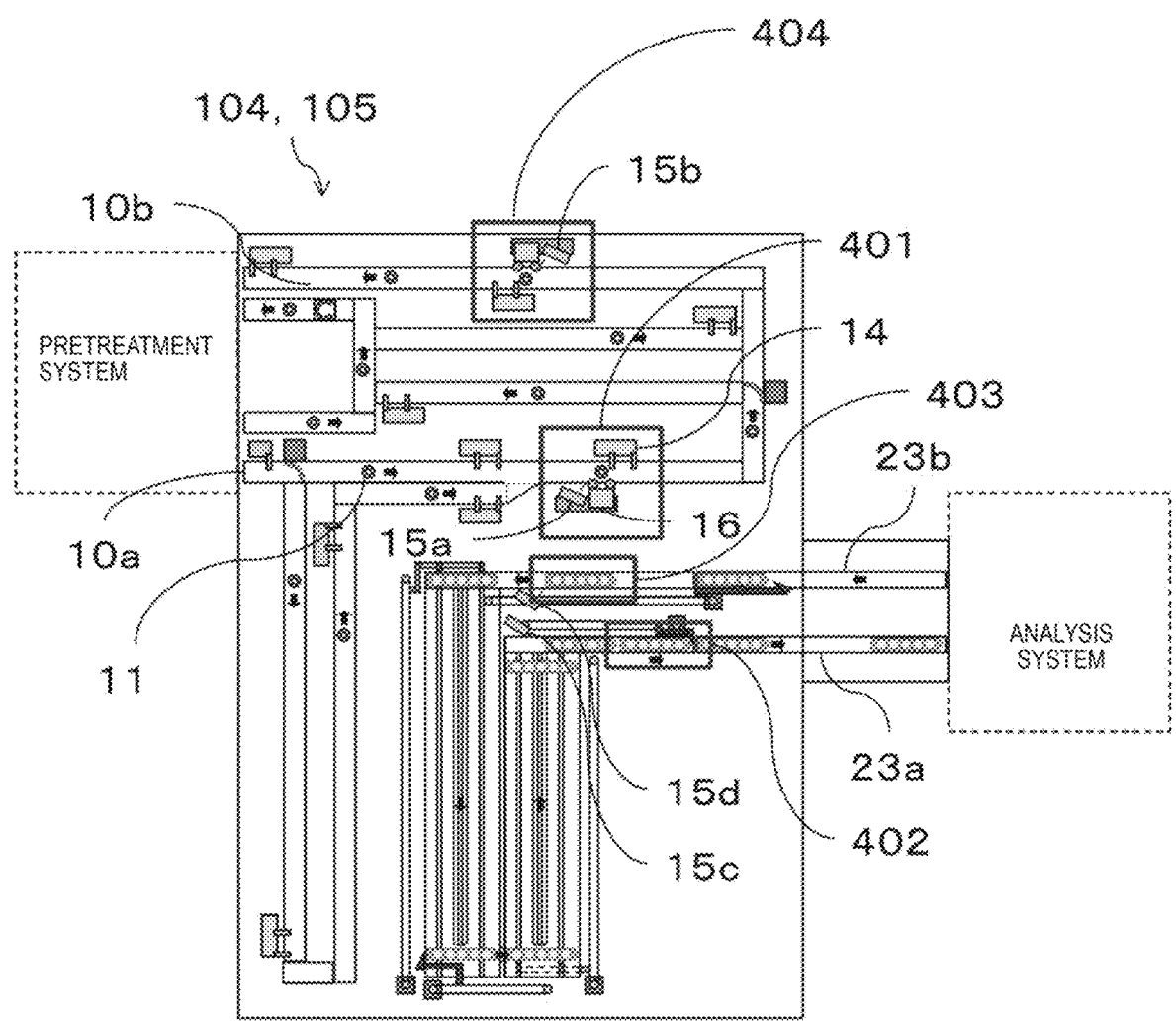
FIG. 3 is a view illustrating an entire configuration of specimen container transferring units.

FIG. 3 is a view illustrating a configuration of the specimen container transferring units 104 and 105.

The specimen container transferring unit includes: holder transporting lines 10*a* and 10*b* that transport the holder transported from the specimen pretreatment system; a specimen chuck mechanism (to be described in detail below) that chucks the specimen container on the transported holder; an XYZ drive mechanism that causes the specimen chuck mechanism to move in vertical and horizontal directions;

and rack transporting lines 23a and 23b that transport the rack, on which the specimen container is mounted, to the analysis system.

The holder transported by the holder transporting line 10a is temporarily stopped by a stopper mechanism 14 at a holder transfer position 401. The specimen chuck mechanism accesses the holder transfer position 401 and chucks and lifts the specimen container, and the specimen container is pulled out from the holder. Then, the specimen chuck mechanism horizontally moves and transfers the holder to an empty position of the rack that waits at a rack transfer position 402 on the rack transporting line 23a.

When the specimen containers are transferred to all of the positions of the rack, or when time out occurs before the next holder arrives, the rack transporting line 23a unloads the rack from the rack transfer position 402 and transports the rack to the analysis system connected on the downstream side.

The specimen container, on which analysis is ended in the analysis system, returns to the specimen container transferring unit by the rack transporting line 23a and is stopped at a rack transfer position 403. Then, the chuck mechanism accesses and unloads the specimen container and transfers the specimen container to the holder that waits at a holder transfer position 404 on a holder transporting line 10b. The specimen container transferred to the holder is transported to the pretreatment system via the holder transporting line 10b and is accommodated in an accommodation unit, or the specimen container is transported to another analysis system via the transporting line 103. Note that the specimen container, on which the analysis is ended, may be accommodated at a certain accommodating place in the analysis device without returning to the holder.

On the respective transporting lines on the specimen container transferring units 104 and 105, bar code readers 15a, 15b, 15c and 15d for reading the bar code label attached on the specimen container are disposed at positions thereon. Also, in order to read the bar code label on the specimen container held on the holder, a rotation mechanism 16 that rotates the holder is provided at a reading position.

Figure 4:
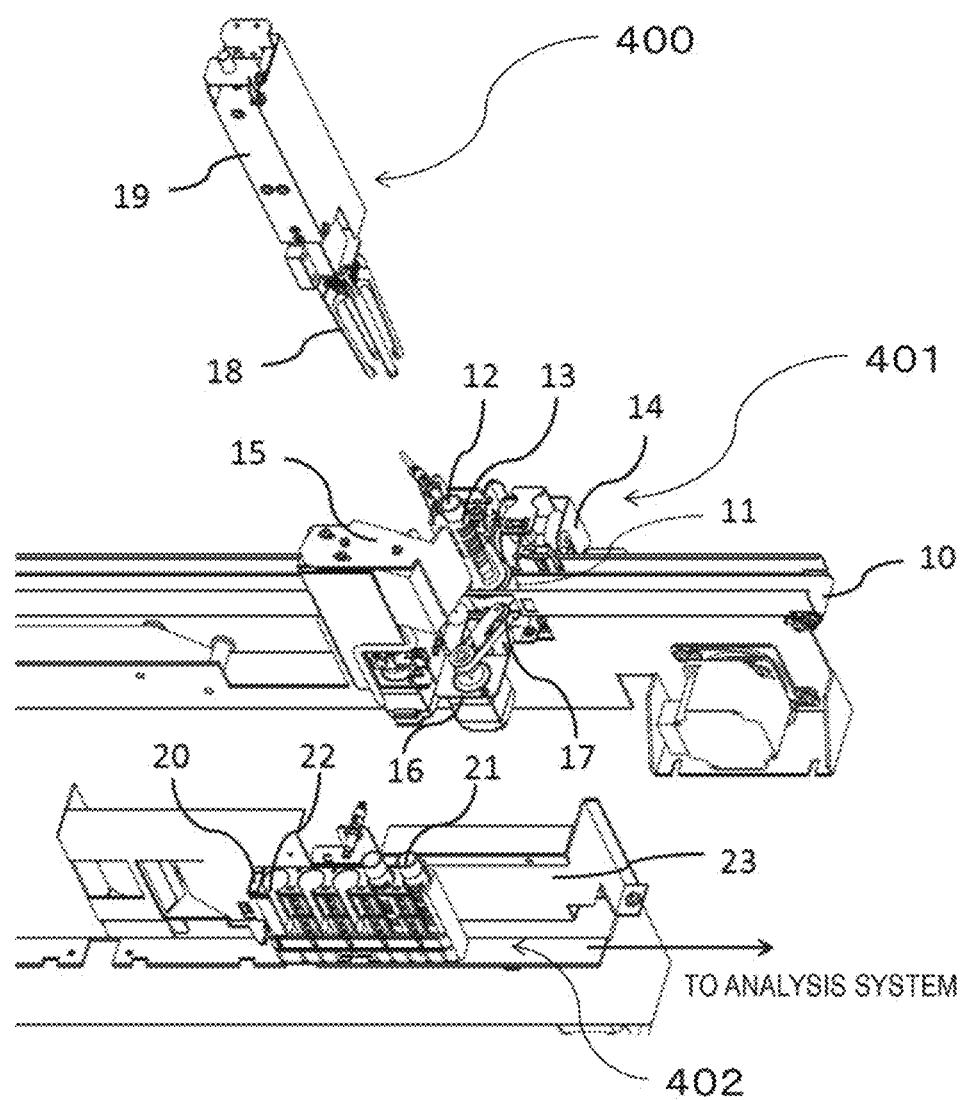
FIG. 4 is a conceptual view illustrating a configuration of elements of a specimen transferring mechanism.

FIG. 4 is a view illustrating a configuration of elements of the specimen transferring mechanism according to the present invention. For example, the specimen transferring mechanism is incorporated in the specimen transferring units 104 and 105 of the specimen pretreatment system.

As described above, rotation occurs in the holders during the transport, and thus the orientations of the bar code label surfaces attached on the specimen containers are not aligned at the time of reaching the specimen transferring unit in some cases. On the other hand, when the specimen containers transferred to the rack have the bar code labels that are not positioned within a slit width of a slit 305, a problem arises in that the bar code reader cannot read the bar code. Therefore, the specimen container transferring unit according to the present invention causes the bar code reader to read the bar code label while rotating the holder at the holder transfer position 401 (label surface adjustment position), and discern the orientation of the label surface. When the orientations of the bar code labels are discerned, the orientations of the label surfaces are appropriately adjusted. Then, the specimen chuck mechanism pulls out the specimen containers from the holders, and the specimen containers are transferred to the rack on the rack transporting line.

A specimen chuck mechanism 400 includes a chuck 19 that grasps the specimen container 12 by a plurality of fingers 18 and a drive mechanism (not illustrated) that causes the chuck 19 to move in the vertical direction and the horizontal direction. The drive mechanism has a drive range over at least a holder transporting line 10 and a rack transporting line 23, in which it is possible to cause the specimen chuck mechanism 400 to move.

The rack 20, to which specimen containers 21 are transferred, moves by one position, and moves to a position at which the specimen chuck mechanism can access the next empty position. In a case where the specimen containers are transferred to all of the positions or the next specimen container is not transported for a certain period of time or longer, the rack moves over the rack transporting mechanism 23 and is transported to an analysis system (not illustrated). In a common analysis system, in order to recognize the specimen, the bar code on the specimen container transferred to the rack 20 is read by the bar code reader (not illustrated) via the slit 22. Operational control and information of the mechanisms are controlled by the control unit 10.

Figure 5:
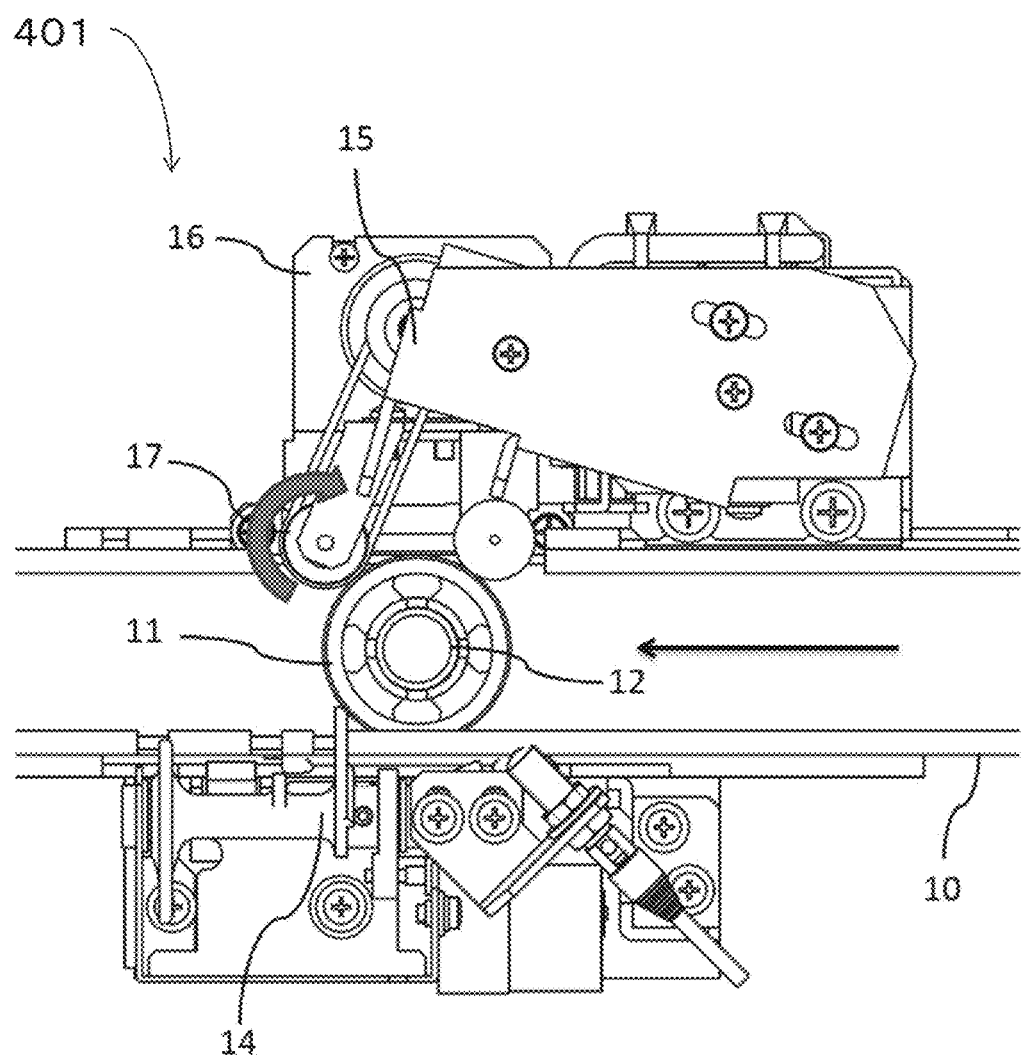
FIG. 5 is a plan view illustrating a part of the mechanism in the configuration of the elements of the specimen transferring mechanism.

FIG. 5 is a top view illustrating a configuration at the label surface adjustment position.

At the label surface position adjustment position, the stopper mechanism 14 that stops a holder 11 at a certain position, the rotation mechanism 16 that rotates the holder that is stopped by the stopper mechanism, and a reader 15 that reads the bar code label attached on the specimen container on the holder are provided. Note that, since a configuration of the reader 15 is not particularly concerned in the present invention, the detailed description thereof is omitted. The reader 15 includes a radiation portion that radiates light for reading the bar code label and a light receiving portion that acquires reflected light from the label. Therefore, a readable region is determined by a radiation region from the radiation portion.

Also, a configuration of the rotation mechanism 16 is not particularly concerned. In this example, a mechanism is used that causes a drive roller 17 that rotates by driving of a motor to come into press contact with the side surface of the holder 11 and causes the specimen container with each holder together to rotate. In another configuration, the specimen container may be brought into contact with adjacent specimen container so as to rotate, or a mechanism that rotates the specimen container while the specimen chuck mechanism chucks the specimen container. Detailed operational principles of the bar code reader 15 and the rotation mechanism 16 are described below.

Figure 6:
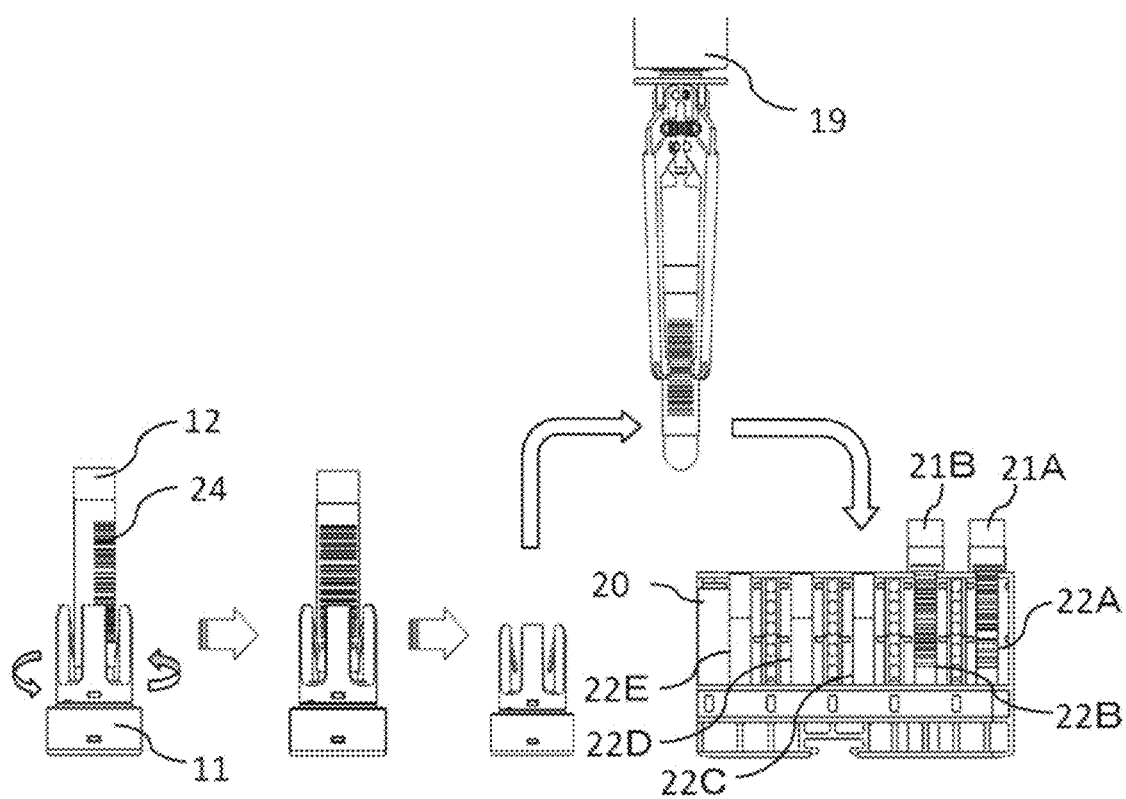
FIG. 6 is a view illustrating a transfer operation of the specimen transferring mechanism.

As illustrated in FIGS. 4, 5 and 6, the rotation mechanism 16 and the bar code reader 15 are both disposed to access the holder 11 stopped by the stopper mechanism 14, and thereby the reader 15 can read the bar code label 24 attached on the side surface 13 of the specimen container 12 held on the holder 11 while the holder, temporarily stopped on the holder transporting line by the stopper mechanism 14, is rotated.

Next, with reference to FIG. 6, a control method of the specimen container at the label surface adjustment position will be described.

First, the side surface of the specimen container is divided into a printed region in which a bar code or a character is printed on a bar code label surface and a non-printed region which has no print on the bar code label surface or the bar code label is not attached in the first place. The holder transported over the holder transporting line 10 is temporarily stopped at the label surface adjustment position, and then the reading of a bar code label 24 is implemented while the holder is rotated. Through the reading operation, the printed region and the non-printed region of the bar code label 24 are discerned.

When the printed region or the non-printed region of the bar code label 24 are discerned, the printed region of the label is adjusted to any orientation, and then the specimen chuck mechanism 19 chucks the specimen containers and lifts and pulls out the specimen containers from the holders. The pulled-out specimen container is transferred to an empty position of a rack 20 on the rack transporting line. Since specimen containers 21A and 21B are transferred to positions 22A and 22B in the rack 20, the transported specimen container is transferred to an empty position 22C.

As described above, the orientation of the specimen container is discerned before the transfer to the rack, and thereby the orientation of the label surface of the specimen container can easily match the slit of the rack at transfer to the rack.

Next, with reference to FIGS. 7 to 9, flow of position adjustment of the label surface at the label surface adjustment position will be described.

First, first reading is implemented for discerning the orientation of the bar code label 24 with respect to the reader 15. Specifically, reading of the specimen container 12 as a reading target is implemented while the holder is rotated by a specified angle, and the printed region and the non-printed region of the bar code label are discerned (S101). In other words, a reading region 800 of the bar code reader scans the front surface of the specimen container by the specified angle.

Figure 8:
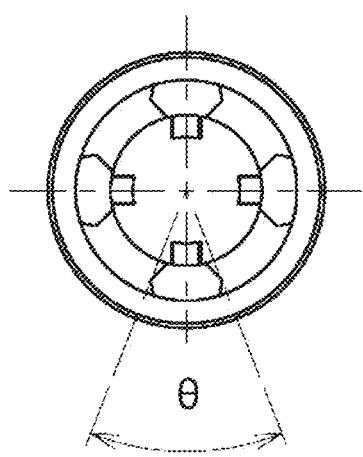
FIG. 8 is a view illustrating a specified angle in Example 1.
Figure 8:
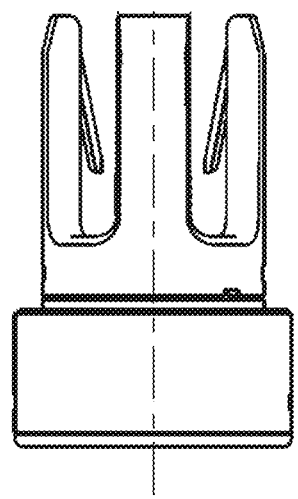

FIG. 8 is a view illustrating a method for determining a rotating angle.

The regulating angle of rotation is determined depending on a size of a target object that is assumed to be an obstacle to the bar code reading. Support posts 302 of the holder are disposed on the circumference of the base portion at equal intervals, and the specified angle is θ or larger in a case where a width of the support post is a circumferential angle θ. For example, four support posts are provided on the circumference at equal intervals, and the specified angle is set to 45° or larger in a case where a circumferential angle formed by connecting both ends of the support post and the center of the holder is 45°. In this manner, the readable region has to scan the printed region of the label at least once during the rotation, each time through the specified angle, and it is possible to succeed in reading even when the support post overlaps the print of the label.

In S101, in a case where it is not possible to perform reading once, the readable region 800 scans the non-printed region of the label during the rotation of the holder, each time through the specified angle. Therefore, it is not possible to read the label surface. Hence, in a state in FIG. 9A, that is, the printed surface of the bar code label is not facing the bar code reader, determination of that the readable region is the non-printed region is performed, and the process proceeds to S105 (S102: N).

Figure 9A:
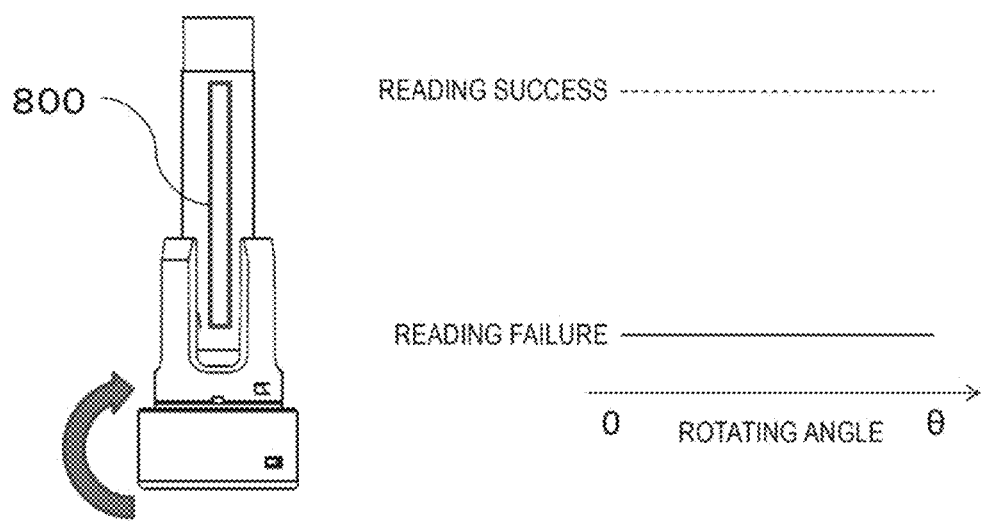
FIG. 9A is a diagram illustrating a relationship between readability of the specimen transferring mechanism and a surface of a printed region of a label.
Figure 9B:
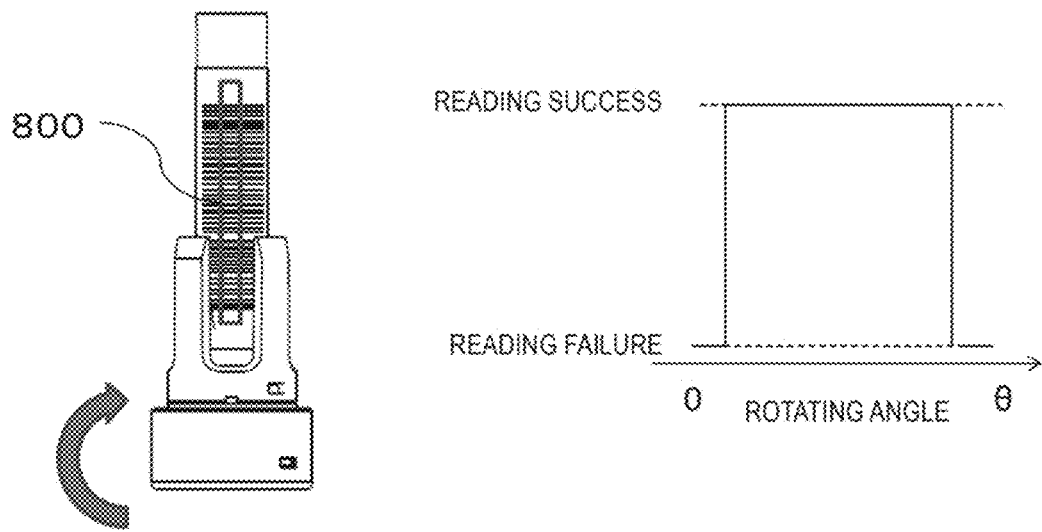
FIGS. 9B and 9C are diagrams illustrating a relationship between the readability of the specimen transferring mechanism and the surface of the printed region of the label.

In a case where the reading succeeds in S101, it is determined that the bar code labels are in states of FIGS. 9B(a) and 9B(b). In other words, it is determined that: the bar code label faces the front surface with respect to the reader; or that the bar code label faces the front surface with respect to the reader but a part of the bar code labels is hidden by the support post of the holder. In this case, determination of that the printed region faces the reading region is performed (S102: Y), and the process proceeds to S103.

Note that it can be discerned which state of FIG. 9B(a) or (B(b) the bar code is in based on a relationship between the rotating angle and reading success/reading failure. In the state in FIG. 9B(a), the center of the printed region is positioned between the support posts of the holder, and the support posts hide both ends of the printed region of the label. Therefore, during the rotation by the specified angle, the reading of the label fails for the first and last timing; however, the reading succeeds at a timing therebetween. On the other hand, in the state in FIG. 9B(b), since the support posts of the holder overlap the center of the printed region of the label, reading of the bar code label fails in the overlapped region; however it is possible to read an area between the support posts in which the printed region is positioned, because rotation is performed by the specified angle θ in S101.

In S103, whether or not processes in S101 and S102 are implemented the specified number of times is determined. It is desirable that the specified number of times is determined in a relationship with the specified angle such that it is possible to check the entire circumference (360°) of the specimen container, when the holder is rotated, each time through the specified angle. Note that the holder may be rotated through the circumference twice or more and it may be possible to perform the check. For example, in a case where the specified angle is 45°, the number of specified times is eight times. When the number of times of retry reading is less than eight times, the process returns to the process in S101, further the reading of the specimen container is implemented while the holder is rotated, each time through the specified angle, and a process of searching for the non-printed region is continued. On the other hand, in a case where the reading is performed the specified times, an error process (S104) is implemented. In the error process (S104), notification that the bar code on a target specimen container is not read is performed, and a transport process is implemented as necessary.

During the rotation at the specified angle in S102, when it is determined that the reading fails (that is, non-printed region), the rotation of the holder by the rotation mechanism is temporarily stopped so that the non-printed region faces the readable region of the bar code reader. In this state, reading of the bar code label is continuously implemented while the holder is rotated, and the printed region of the bar code label is searched (S105). The maximum rotating angle is 360°.

Figure 9C:
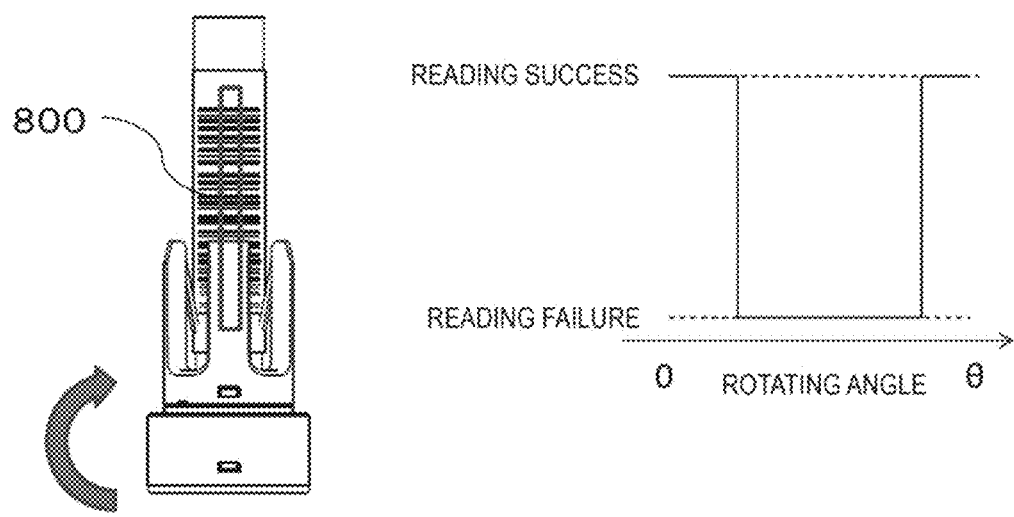
Figure 9D:
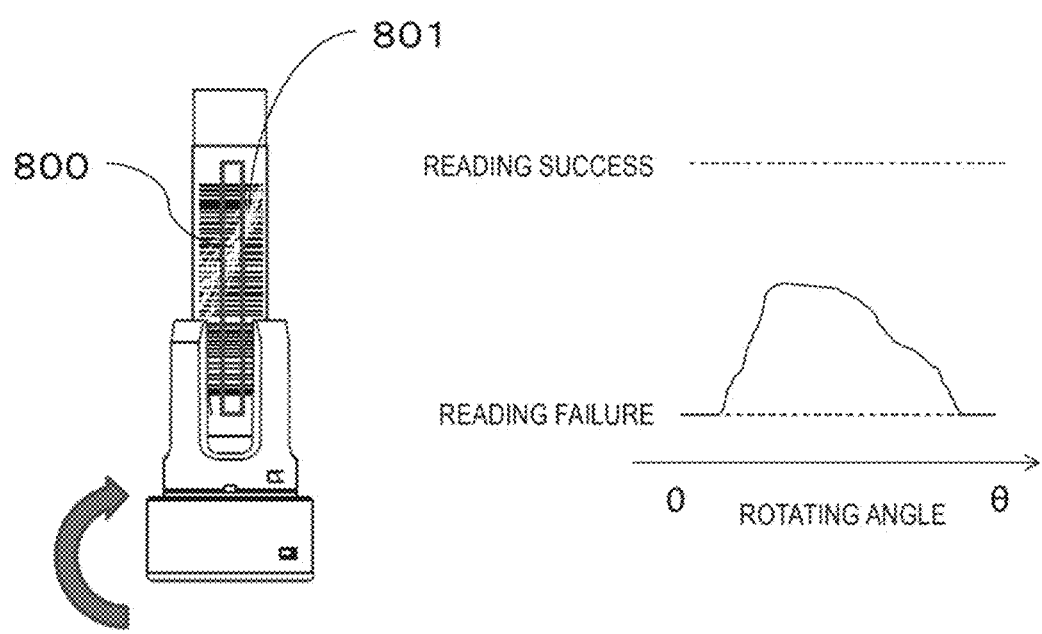
FIG. 9D is a diagram illustrating a relationship between the readability of the specimen transferring mechanism and the surface of the printed region of the label.
Figure 10A:
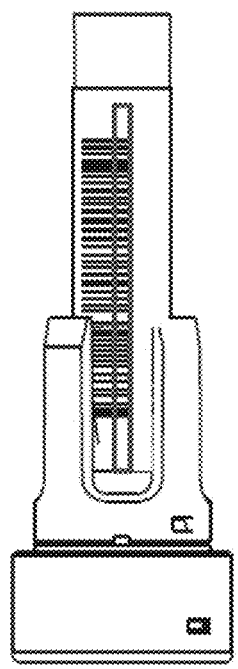
FIGS. 10A and 10B are views illustrating a positional relationship between a reading region of a bar code reader and the printed region.
Figure 10B:
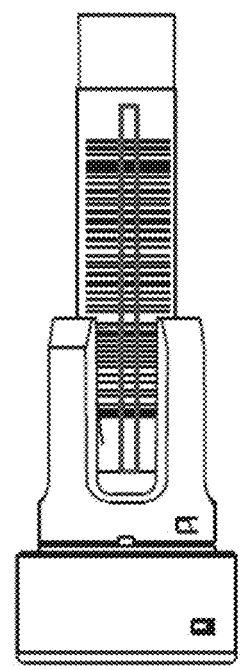

When the reading of the bar code label succeeds in S105 (S106: Y), it is determined that the end portion of the printed region is identified, and the process proceeds to S107. On the other hand, in a case where it is not possible to perform the reading once in S105 (S106: N), it is determined that the bar code label is not attached on the specimen container, or that the bar code label is unreadable, and the error process (S104) is implemented. As a state in which the bar code label is unreadable, the reading is not performed due to scratches and dirt 801 on the bar code label as illustrated in FIG. 9C. In this manner, the specimen container, on which the error process is implemented, is collected to a collection portion for the error specimen without the implement of the transfer to rack.

In S107, the holder is further rotated by a certain angle from a point at which the reading of the end portion of the bar code label succeeds in S106. This step may be omitted. The holder is rotated, and thereby it is possible to adjust the center of the printed region of the bar code label at a desirable angle. Thus, it is possible to align the center of the bar code label surface at a slit position of the rack. The rotation amount of the holder is determined in consideration of a positional relationship between the reader 15 and the transfer destination rack 20 and a period of communication time. Thus, it is desirable to have a state in which the bar code is as broadly viewed as possible from the front surface with respect to the slit 22.

The rotation mechanism is stopped after the holder is rotated by the predetermined angle, and the position of the label surface on the specimen container is fixed (S108). In this state, the specimen chuck mechanism accesses the specimen container on the holder, and the specimen container is chucked and transfer to the rack is implemented.

According to the method, since the printed region and the non-printed region are discerned while the holder is rotated, each time through the specified angle, as illustrated in FIG. 9B(b), it is possible to correctly determine the orientations of the label surfaces and thus it is possible to adjust the orientations, even in a case where the orientations of the label surfaces are determined that it is not possible to perform reading when the reading is started.

Note that, in the example, the specimen container transferring mechanism is described as an example; however, simply the mechanism may be used only for matching the position of the label surface at the bar code reading position or the like without implementing a transferring process of the specimen container.

Also, in the example, the transferring process of the specimen container to the five-position rack from the single holder is described as an example; however, the movement therebetween is not limited thereto, and the transferring process may be used to adjust the orientations when the specimen containers are transferred to a tray that can hold the specimen containers in an array shape.

In the example, a combination of the bar code label and the bar code reader is described as an example; however, a label (for example, two-dimensional bar code) other than the bar code label may be used. In addition, in a case where characters that are readable by a person are printed in the label, and the label is discerned by analyzing the captured image, a camera may be provided instead of the bar code reader. Also, in a case, characters printed on an outer wall of the specimen container may be read.

Also, according to the example, the rotation mechanism 16 is provided as an example of means that rotates the specimen container 12; however, the chuck mechanism 19 may have a rotating function and may rotate the specimen container. As the rotating method, in a case where the chuck mechanism 19 has the rotating function and rotates the specimen container by grasping and lifting the specimen container, a circumferential angle of the fingers is set as the specified angle in Step S101 in FIG. 7.

Example 2

Next, another example for adjusting an orientation of a label will be described. Hereinafter, the description of the same portions as those in Example 1 is omitted.

In the method in Example 1, when reading accuracy of the bar code is low, the determination of "bar code reading failure" is performed although the bar code actually has the correct orientation and, as a result, there is possibility that the process is determined to be an error process. When the error process occurs, the process is interrupted, or a retry process is performed. Hence, an entire period of processing time is elongated. More specifically, even in a state in which the process needs to be determined as success in S102 in FIG. 7, the process is determined to be failure when the reading accuracy of the bar code is low, and the process is considered to proceed to the process in S105. Originally, there is a premise in which the non-printed region is identified in a case where the process proceeds from S102 to S105; however, since the process in S105 is started while the non-printed region is not actually identified in such a case, the process is determined as failure in S106 and, as a result, the process is the error process in S104. Accordingly, in the example, a method in which it is possible to align the orientations of the labels without depending on the reading accuracy of the bar code is described.

As described in Example 1, when the holder is stopped on the transporting line by the stopper mechanism 14, first, the bar code reading and the rotation of the holder are continuously performed until the reading of the information printed in the printed region on the side surface of the specimen container succeeds (S201). By this means, the holder is rotated until the printed region is positioned in the bar code reading region 800 of the reader 15 (S201 and S202). As described above, the rotation of the holder is performed by the drive roller 17. Note that, since the holder is rotated, and thereby the specimen container that is held in the holder simultaneously rotates, it is possible to consider that the rotation of the holder in the example of the description has the same meaning as the rotation of the specimen container. An operation of the drive roller 17 is controlled by the control unit 106. Also, the reader 15 reads the bar code, and the control unit 106 determines success or failure of the reading. The operations of the drive roller 17, the reader 15, and the control unit 106 are the same in each step below. The maximum rotating angle is 360°, the process is determined to be an error in a case where reading does not succeed once during 360° rotation (S202). For example, the process is determined to be the error process in a case where a readable label is not attached thereon.

In a case where the reading succeeds in S202, the printed region exists in at least the orientation in which the reading succeeds. Therefore, when the holder is rotated while the bar code is continuously read from the identified printed region, it is possible to identify the location of the end portion of the label in some cases. In a case where a structure in which reverse rotation of the holder can be performed, it is possible to match the center of the label with the orientation of the reader 15, when the reverse rotation is performed by a certain angle (more specifically, a half of the width of the label) after the location of the end portion of the label is identified. However, in a case where the holder can rotate in only one direction, it is not possible to match the center of the label with the orientation of the reader 15 even when the location of the end portion of the label is identified in the method. Therefore, it is particularly effective to use a method of identifying the end portion of the printed region after the non-printed region is temporarily identified as will be described below.

After the reading succeeds in S202 and the rotation is performed until the printed region moves to the bar code reading region 800, the reading of the bar code is implemented while the holder is rotated by the regulating angle (S203). In S203, the holder is rotated in the same direction as in S201. In S203, the rotation is intermittently performed for each specified angle.

In a case where there exists an orientation in which the bar code can be normally read during the rotation by the specified angle in S203, the bar code is further read while rotation is performed by the specified angle. For example, in both case of FIGS. 9B(a) and 9B(b), there always exists an orientation within the specified angle in which the bar code can be normally read.

The process of S203 iterates until the reading fails (S204). Here, in a case where the process iterates the specified times, the process is considered as an error (S205). The control unit 106 determines whether the process is iterated the specified times. Here, the regulating angle and the specified times are set in the same method as illustrated in FIG. 7 described above. In other words, it is preferable that the specified angle is equal to or larger than the circumferential angle θ (refer to FIG. 8) corresponding to the width of the support posts 202. In other words, the specified angle may be described to be equal to or larger than the circumferential angle formed between both ends of the support post 202 and the center of the holder.

In a case where the reading does not succeed even once during the rotation by the specified angle, the reading is determined to be failure in S204. In a case where the specified angle is appropriately set (that is, equal to or larger than the circumferential angle θ corresponding to the width of the support post 202), the bar code is not unreadable because of being interrupted by the support posts 202, but the readable bar code does not exist within the specified angle (state in FIG. 9A). In other words, S204 has an objective to identify the non-printed region. Accordingly, in a case where the process proceeds from S204 to S206, the non-printed region is positioned in the orientation of the bar code reading region 800.

The reading of the bar code is determined to be successful under determination criteria. There exists two types of such criteria: a case where the success is determined when it is possible to acquire information from the bar code, and a case where the success is determined only in a case where the acquired bar code information is identical with the information acquired in advance. In a case where the determination criterion is the latter, it is possible to perform reading; however, there is a concern that it is not possible to acquire accurate information in a state illustrated in FIG. 9B(b) in which the label overlaps the support posts 202. In a case where it is not possible to acquire the accurate information due to the support posts 202, the reading is determined to be failure. Therefore, the region is determined to be the non-printed region though the region is on the printed region. In such a case, determination is performed on the basis of a plurality of reading results (for example, success or failure of the reading results twice in 0 to θ and θ to 2θ) in S204, and thereby it is possible to discriminate the non-printed region in the state in FIG. 9B(b). For example, in a case where failure is determined consecutively twice, it is possible to determine that the region is not in a state illustrated in FIG. 9B(b), but the region is the non-printed region.

The rotation of the holder is continuously performed while the bar code reading is again performed from the orientation in which the reading fails in S204 (S206), and the holder rotates until the reading succeeds (S207). A position at which the reading succeeds for the first time in S206 corresponds to the end portion of the printed region. Note that a case where the end portion of the printed region is hidden by the support posts 202 is assumed to occur; however, in such a case, the position at which the reading succeeds for the first time in S206 corresponds to a boundary between the support post 202 and the bar code. In such a case, the orientation of the support post 202 is shifted by the width thereof; however, it is possible to transfer the bar code such that the bar code is positioned in the slit 205 of the rack 203 even when usually such a degree of shift occurs. Hence, such a case is also included in the description, and the portion is referred to as the "end portion of printed region". As described above, the holder is continuously rotated from the non-printed region in S206 and S207, and thus it is possible to identify the printed region.

Also, if it is possible to perform the reverse rotation of the holder, the rotating operation in S206 is the reverse rotation to the rotating operation in S203, and thereby it is possible to shorten a period of time during which the end portion of the printed region is identified.

Next, similar to S107 described above, the holder is rotated by a certain angle (for example, the circumferential angle corresponding to a half of the width of the bar code) from the point at which the end portion of the printed region is identified in S206 and S207, and the center of the printed region of the bar code label is adjusted at a desired angle (for example, the center of the slit 205) and the rotation is stopped (S208 and S209).

Then, as described in Example 1, the specimen chuck mechanism pulls out the specimen container from the holder and transfers the specimen container to the rack 203.

Figure 7:
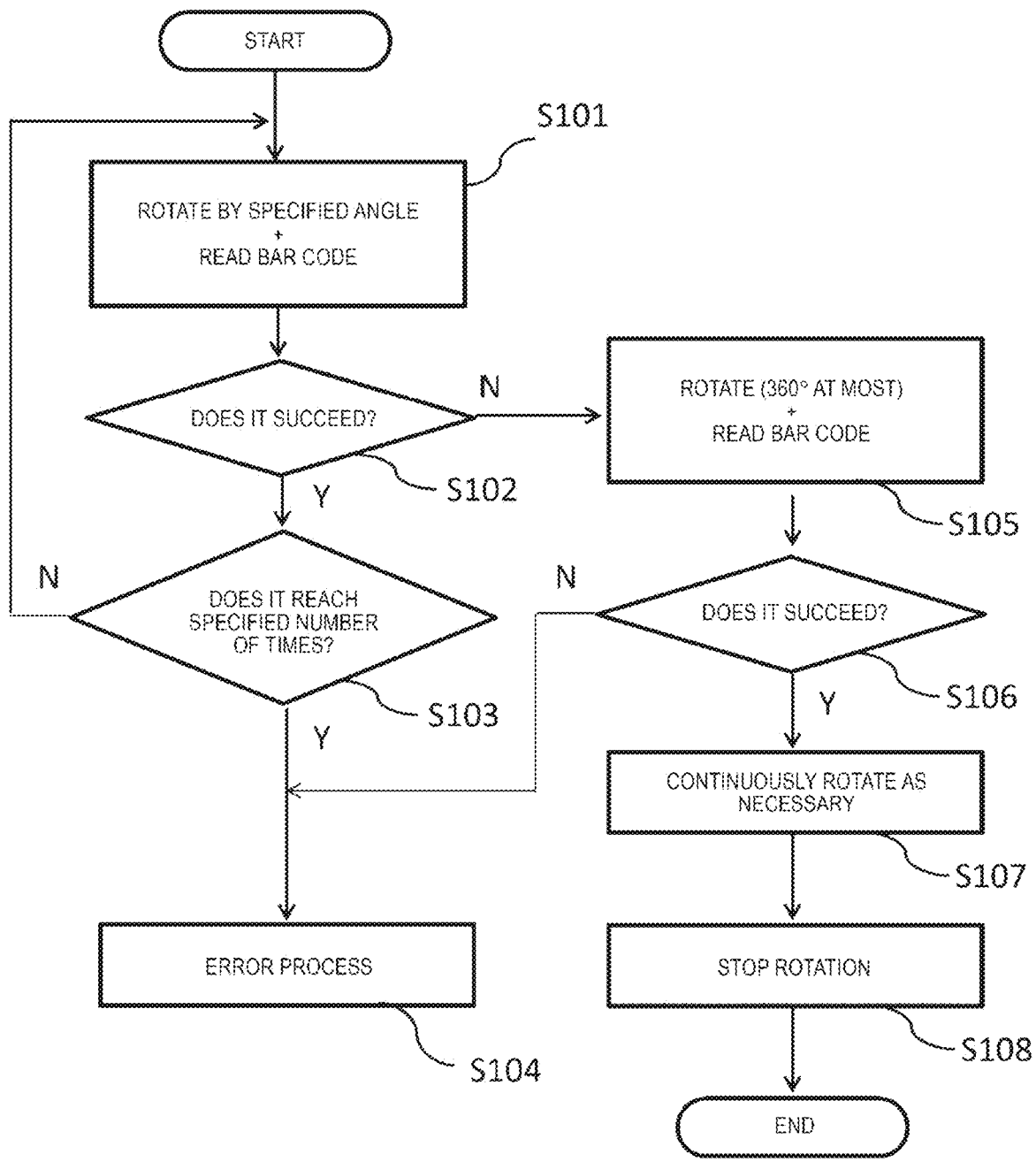
FIG. 7 is a flowchart illustrating operational control flow in a label surface adjustment position in Example 1.
Figure 11:
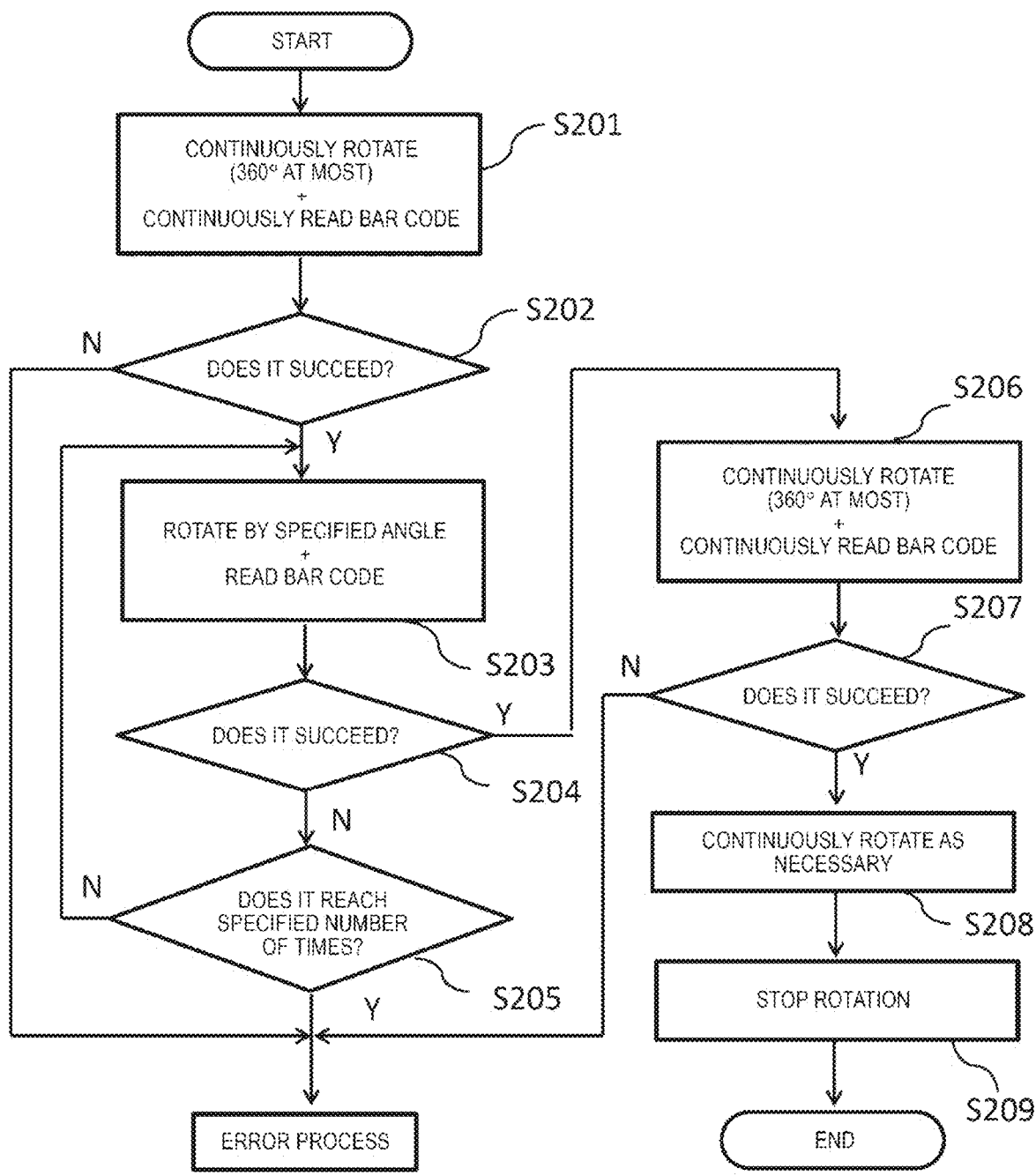
FIG. 11 is a flowchart illustrating operational control flow in a label surface adjustment position in Example 2.

In the method of Example 1 illustrated in FIG. 7, rotation is performed from the non-printed region and the end portion of the printed region is identified; however, in the method of Example 2 illustrated in FIG. 11, after the printed region is identified, the orientation is temporarily changed to the non-printed region, then rotation is performed again, and the end portion of the printed region is identified. In other words, in the method in FIG. 11, since both of the locations of the printed region and the non-printed region are identified, and then the rotation is performed to the end portion of the printed region, it is possible to stably align the orientations of labels regardless of the reading accuracy of the bar code. By this means, the error processes are reduced and, as a result, it is possible to shorten the entire period of operation time.

Note that the present invention is not limited to the examples described above, and includes various modification examples. For example, the examples are described in detail for easy understanding of the present invention, and the present invention is not necessarily limited to including the entire configuration described above. Also, it is possible to add another configuration to, to remove, or to replace, with another configuration, a part of each of the configurations of the examples. Also, a part or the entirety of the control processes or the like may be realized by hardware by designing an integrated circuit, for example. Also, a part or the entirety of the control processes or the like may be realized with software by analyzing and performing programs by which processors realize respective functions. It is possible to place information of the programs, tables, files, or the like that realizes the functions in a recording device such as a memory, a hard disk, a solid state drive (SSD) or a recording medium such as an IC card, an SD card, an optical disk, or the like. Also, control wires or information wires are illustrated when the wires are considered to be necessary for description, and all of the control wires or the information wires are not necessarily illustrated for a product. Actually, almost all of the configurations may be considered to be connected to each other.

REFERENCE SIGNS LIST

10: holder transporting mechanism
11: holder
12: specimen container
13: side surface of specimen container
14: stopper mechanism
15: reader
16: rotation mechanism
17: drive roller
18: finger 19: chuck mechanism
20: rack
22, 22A, 22B, 22C, 22D: slit
23: rack transporting mechanism
24: bar code

The invention claimed is:

1. A specimen transporting device comprising:
a plurality of holders which detachably hold, one by one, specimen containers having a non-printed region and a printed region on a side surface thereof, each of the holders including a base portion and support posts disposed on a circumference of the base portion at equal intervals, wherein a width of the support posts with respect a center of the holder amounts to a predetermined circumferential angle and at least one support post at least partially overlaps the printed region of a specimen container held by the holder;
a holder transporting mechanism configured to transport the holders;
a reading mechanism that is capable of reading information printed in the printed region on the side surface of each specimen container;
a holder rotating mechanism provided at a holder transfer position and configured to rotate a respective holder such that a respective specimen container held by the respective holder rotates simultaneously, wherein the holder rotating mechanism is configured to perform a preliminary rotation control of continuously rotating the respective specimen container while the reading mechanism reads the information printed in the printed region, subsequently perform a first rotation control of intermittently rotating the respective specimen container, each time by a certain angle equal to or larger than the predetermined circumferential angle, and subsequently perform a second rotation control of continuously rotating the respective specimen container, in a state in which the specimen container is held in the respective holder;
a control unit that controls the holder rotating mechanism and is programmed to implement:
a first step of identifying a location of the printed region of the respective specimen container on the basis of success of the reading by the reading mechanism during the preliminary rotation control,
a second step of identifying a location of the non-printed region of the respective specimen container on the basis of the success of the reading by the reading mechanism during the first rotation control, from the location identified in the first step,
a third step of identifying a position at which the reading succeeds on the basis of the success of the reading by the reading mechanism during the second rotation control, from the location identified in the second step, wherein the position at which the reading succeeds is an end portion of the printed region of the respective specimen container or, when the end portion of the printed region is hidden by the at least one support post of the respective holder, a boundary between the at least one support post and the printed region, and
a fourth step, after the third step, of adjusting the location of the printed region of the respective specimen container, including rotating the specimen container by a certain angle from the position at which the reading succeeded during the third step, and adjusting a center of the printed region at a desired angle; and
a fifth step of determining, in a case in which the respective specimen container has been rotated by the predetermined circumferential angle a predetermined number of times without successfully reading the bar code, that an error exists in the respective specimen container, and initiating an error determination process for the respective specimen container;
a specimen chuck mechanism provided at the holder transfer position and configured to unload, from the respective holder, the respective specimen container held on the respective holder, wherein the control unit is further programmed to unload the respective specimen container from the respective holder after the fourth step; and
a rack which detachably holds the respective specimen container and is provided with a slit on a side surface thereof; and
a rack transporting mechanism configured to transport the rack;
wherein the chuck mechanism is configured to transfer, to the rack, the respective specimen container unloaded from the respective holder such that the center of the printed region matches the center of the slit of the rack.

2. The specimen transporting device according to claim 1, further comprising:
a stopper mechanism that stops the transport of the respective holder at the holder transfer position of the holder transporting mechanism,
wherein the reading mechanism and the holder rotating mechanism are both disposed to access the respective holder at the holder transfer position at which the stopper mechanism stops the respective holder.

3. A specimen transporting method comprising:
a plurality of holders which detachably hold, one by one, specimen containers having a non-printed region and a printed region on a side surface thereof, each of the holders including a base portion and support posts disposed on a circumference of the base portion at equal intervals, wherein a width of the support posts with respect a center of the holder amounts to a predetermined circumferential angle and at least one support post at least partially overlaps the printed region of a specimen container held by the holder;
a holder transporting mechanism configured to transport the holders;
a reading mechanism that is capable of reading information printed in the printed region on the side surface of each specimen container;
a holder rotating mechanism provided at a holder transfer position and configured to rotate a respective holder such that a respective specimen container held by the respective holder rotates simultaneously, wherein the holder rotating mechanism is configured to perform a preliminary rotation control of continuously rotating the respective specimen container while the reading mechanism reads the information printed in the printed region, subsequently perform a first rotation control of intermittently rotating the respective specimen container, each time by a certain angle equal to or larger than the predetermined circumferential angle, and subsequently perform a second rotation control of continuously rotating the respective specimen container, in a state in which the specimen container is held in the respective holder;
a control unit that controls the holder rotating mechanism the method steps comprising:
a first step of identifying a location of the printed region of the respective specimen container on the basis of success of the reading by the reading mechanism during the preliminary rotation control, a second step of identifying a location of the non-printed region of the respective specimen container on the basis of the success of the reading by the reading mechanism during the first rotation control, from the location identified in the first step, a third step of identifying a position at which the reading succeeds on the basis of the success of the reading by the reading mechanism during the second rotation control, from the location identified in the second step, wherein the position at which the reading succeeds is an end portion of the printed region of the respective specimen container or, when the end portion of the printed region is hidden by the at least one support post of the respective holder, a boundary between the at least one support post and the printed region, and a fourth step, after the third step, of adjusting the location of the printed region of the respective specimen container, including rotating the specimen container by a certain angle from the position at which the reading succeeded during the third step, and adjusting a center of the printed region at a desired angle; and a fifth step of determining, in a case in which the respective specimen container has been rotated by the predetermined circumferential angle a predetermined number of times without successfully reading the bar code, that an error exists in the respective specimen container, and initiating an error determination process for the respective specimen container;

a specimen chuck mechanism provided at the holder transfer position and configured to unload, from the respective holder, the respective specimen container held on the respective holder, wherein the control unit is further programmed to unload the respective specimen container from the respective holder after the fourth step; and a rack which detachably holds the respective specimen container and is provided with a slit on a side surface thereof; and a rack transporting mechanism configured to transport the rack;

wherein the chuck mechanism is configured to transfer, to the rack, the respective specimen container unloaded from the respective holder such that the center of the printed region matches the center of the slit of the rack.

* * * * *